United States Patent
Nam et al.

(10) Patent No.: US 9,632,350 B2
(45) Date of Patent: Apr. 25, 2017

(54) LIQUID CRYSTAL DISPLAY DEVICE

(71) Applicant: Samsung Display Co., LTD., Yongin, Gyeonggi-Do (KR)

(72) Inventors: Yun-Ha Nam, Asan-si (KR); Won-Ju Kim, Asan-si (KR)

(73) Assignee: Samsung Display Co., Ltd. (KR)

( * ) Notice: Subject to any disclaimer, the term of this patent is extended or adjusted under 35 U.S.C. 154(b) by 137 days.

(21) Appl. No.: 14/461,690

(22) Filed: Aug. 18, 2014

(65) Prior Publication Data

US 2015/0277185 A1    Oct. 1, 2015

(30) Foreign Application Priority Data

Mar. 31, 2014    (KR) ................ 10-2014-0037945

(51) Int. Cl.
*G02F 1/1335*    (2006.01)
*G02F 1/1333*    (2006.01)
*F21V 8/00*    (2006.01)

(52) U.S. Cl.
CPC ....... *G02F 1/133512* (2013.01); *G02B 6/005* (2013.01); *G02F 1/133308* (2013.01); *G02F 1/133504* (2013.01); *G02F 1/133528* (2013.01); *G02F 2001/13332* (2013.01); *G02F 2001/133314* (2013.01); *G02F 2001/133317* (2013.01); *G02F 2001/133322* (2013.01); *G02F 2201/50* (2013.01)

(58) Field of Classification Search
CPC .............................. G02F 1/133504
See application file for complete search history.

(56) References Cited

U.S. PATENT DOCUMENTS

| | | | |
|---|---|---|---|
| 6,930,734 | B2 | 8/2005 | Lee |
| 6,954,243 | B2 | 10/2005 | Ota et al. |
| 7,535,537 | B2 | 5/2009 | Lee et al. |
| 2012/0106197 | A1* | 5/2012 | Lai .................. B32B 37/12 362/609 |
| 2014/0301104 | A1* | 10/2014 | Lan .................. G02B 6/0088 362/607 |

FOREIGN PATENT DOCUMENTS

| | | |
|---|---|---|
| JP | 2005-243572 | 9/2005 |
| KR | 10-0674235 | 1/2007 |
| KR | 10-2011-0019823 | 3/2011 |
| KR | 10-2011-0030221 | 3/2011 |

* cited by examiner

*Primary Examiner* — Paisley L Arendt
*Assistant Examiner* — Edmond Lau
(74) *Attorney, Agent, or Firm* — Innovation Counsel LLP (57) ABSTRACT

A liquid crystal display device includes a backlight assembly including a light source that generates a light and an optical sheet that transmits the light, and a display panel disposed on the backlight assembly. The optical sheet includes a light-transmitting portion and an extending portion that are formed as a unitary single unit, and further includes a side light-blocking portion that is combined with the extending portion. The light-transmitting portion extends in a first direction, and the extending portion extends continuously from an end of the light-transmitting portion in a second direction that is different from the first direction.

7 Claims, 9 Drawing Sheets

LIQUID CRYSTAL DISPLAY DEVICE

PRIORITY STATEMENT

This application claims priority under 35 U.S.C. §119 to Korean Patent Application No. 10-2014-0037945, filed on Mar. 31, 2014, and all the benefits accruing therefrom, the content of which is herein incorporated by reference in its entirety.

BACKGROUND

1. Field

The present system and method relate to a liquid crystal display device. More particularly, the present system and method relate to a liquid crystal display device that has improved display quality.

2. Description of the Related Art

Generally, a liquid crystal display device includes a display panel and a backlight assembly that provides light to the display panel. The display panel includes a display area for displaying images, and a peripheral area that includes a driver for driving the display area.

The backlight assembly includes a light source, a light guide plate for guiding light generated by the light source to the display panel, an optical sheet for adjusting the characteristics of the light exiting from the light guide plate, and a supporting member for supporting the optical sheet.

For example, the optical sheet may have a planar shape and be disposed parallel to a light-exiting surface of the light guide plate. Light reflected in the optical sheet may leak through a side surface of the optical sheet and thereby deteriorate the display quality of the liquid crystal display device. To prevent the light leakage, a light-blocking tape may be attached to a peripheral area of a top surface of the optical sheet. However, because the optical sheet is generally thin, it provides little surface area for attaching the light-blocking tape. Consequently, when the temperature of the liquid crystal display device increases, the light-blocking tape may easily separate from the optical sheet as the light-blocking tape and the optical sheet expand at different rates. When separation occurs, impurities from the separated light-blocking tape may contaminate the liquid crystal display device.

SUMMARY

Exemplary embodiments provide a liquid crystal display device that prevents or otherwise reduces leakage light to improve display quality.

In an embodiment, a liquid crystal display device includes a backlight assembly including a light source that generates light and an optical sheet that transmits the light, and a display panel disposed on the backlight assembly. The optical sheet includes a light-transmitting portion and an extending portion that are formed as a unitary single unit, and further includes a side light-blocking portion that is combined with the extending portion. The light-transmitting portion extends in a first direction. The extending portion extends continuously from an end of the light-transmitting portion in a second direction that is different from the first direction.

In an embodiment, the second direction is perpendicular to the first direction.

In an embodiment, the optical sheet further includes a front light-blocking portion that covers a portion of the light-transmitting portion.

In an embodiment, the side light-blocking portion includes a printed light-blocking layer that contains a black pigment and is printed on at least a surface of the extending portion.

In an embodiment, the liquid crystal display device further includes a first supporting member that supports the optical sheet, wherein the extending portion of the optical sheet covers at least a portion of a side surface of the first supporting member.

In an embodiment, the liquid crystal display device further includes an adhesive member that secures the extending portion with the side surface of the supporting member.

In an embodiment, the extending portion includes a combination hole, and the supporting member includes a protrusion that inserts into the combination hole.

In an embodiment, the liquid crystal display device further includes a fixing frame that secures the display panel and surrounds a side surface of the backlight assembly, and a combination member that passes through the fixing frame and the extending portion and inserts into the supporting member.

In an embodiment, the supporting member includes a supporting protrusion that passes through the light-transmitting portion of the optical sheet and supports the display panel.

In an embodiment, the liquid crystal display device further includes a spacer that is disposed near an edge of the optical sheet to maintain a gap between the optical sheet and the display panel.

In an embodiment, the optical sheet is a diffusion sheet, a prism sheet, a polarizing sheet or a protective sheet, and the liquid crystal display device further includes at least one additional optical sheet disposed under the optical sheet, and the extending portion of the optical sheet covers a side surface of the additional optical sheet.

In an embodiment, the liquid crystal display device further includes a supporting member that supports the display panel. The second supporting member includes a sidewall portion that surrounds a side surface of the optical sheet, and a supporting portion that extends from the sidewall portion to be disposed between the display panel and the optical sheet.

In an embodiment, a liquid crystal display device includes a backlight assembly, a display panel disposed on the backlight assembly and a cover sheet disposed on the display panel. The backlight assembly includes a light source that generates light and an optical sheet that transmits the light. The cover sheet includes a light-transmitting portion and an extending portion that are formed in as a unitary single unit, and further includes a side light-blocking portion that is combined with the extending portion. The light-transmitting portion extends in a first direction. The extending portion extends continuously from an end of the light-transmitting portion in a second direction different from the first direction.

In an embodiment, the second direction is perpendicular to the first direction.

In an embodiment, the cover sheet further includes a front light-blocking portion that covers a portion of the light-transmitting portion.

In an embodiment, the liquid crystal display device further includes a supporting member that supports the optical sheet. The extending portion covers side surfaces of the display panel, the optical sheet and the supporting member.

In an embodiment, the liquid crystal display device further includes an adhesive member that secures the extending portion with a side surface of the supporting member.

In an embodiment, the extending portion includes a combination hole, and the supporting member includes a protrusion that inserts into the combination hole.

In an embodiment, the liquid crystal display device further includes a combination member that passes through the extending portion and inserts into the supporting member.

In an embodiment, the side light-blocking portion includes a printed light-blocking layer that contains a black pigment and is printed on at least a surface of the extending portion.

According to the exemplary embodiments, light leakage in a peripheral area of a liquid crystal display device may be blocked to improve display quality. Furthermore, a light-blocking layer included in an optical sheet provides stability against temperature variance. Furthermore, a cover sheet that protects and secures a display panel may be disposed on the display panel to reduce a bezel size of a liquid crystal display device as well as to block light leakage in a peripheral area of the liquid crystal display device.

A liquid crystal display device according to the exemplary embodiments may be used for various display devices including a monitor, a mobile phone, a television, a navigator, a music player, a lap top, a tablet computer or the like.

BRIEF DESCRIPTION OF THE DRAWINGS

The accompanying drawings, which are included as part of the present application, illustrate various embodiments and together with the description of the various embodiments given below serve to explain and teach the principles described herein. The figures in the drawings are not necessarily drawn to scale and are only intended to facilitate the description of the various embodiments described herein. The figures do not describe every aspect of the teachings disclosed herein and do not limit the scope of the claims:

DETAILED DESCRIPTION

Exemplary embodiments are described more fully hereinafter with reference to the accompanying drawings in which various embodiments are shown.

Figure 1:
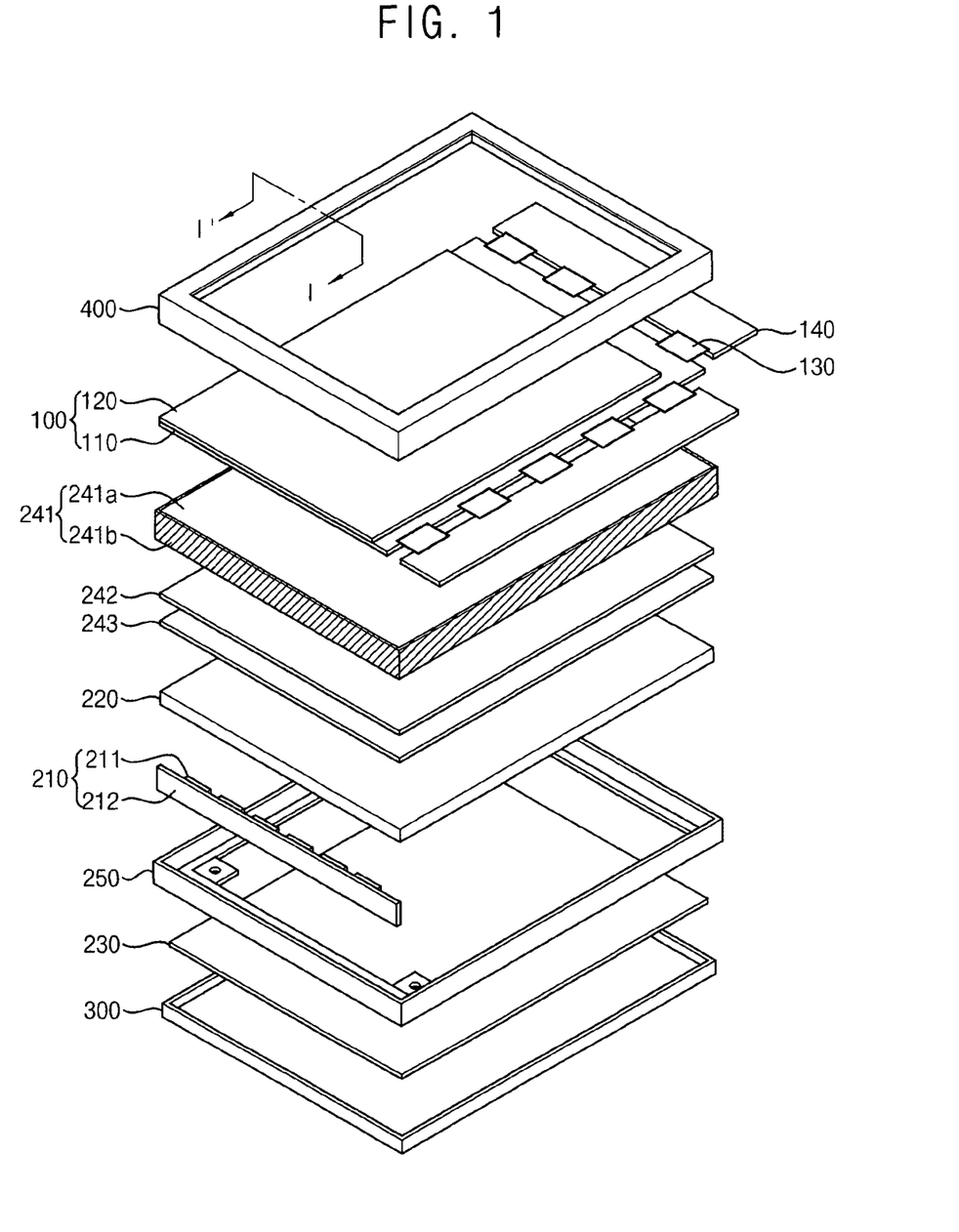
FIG. 1 is a perspective view of a liquid crystal display device according to an exemplary embodiment.
Figure 2:
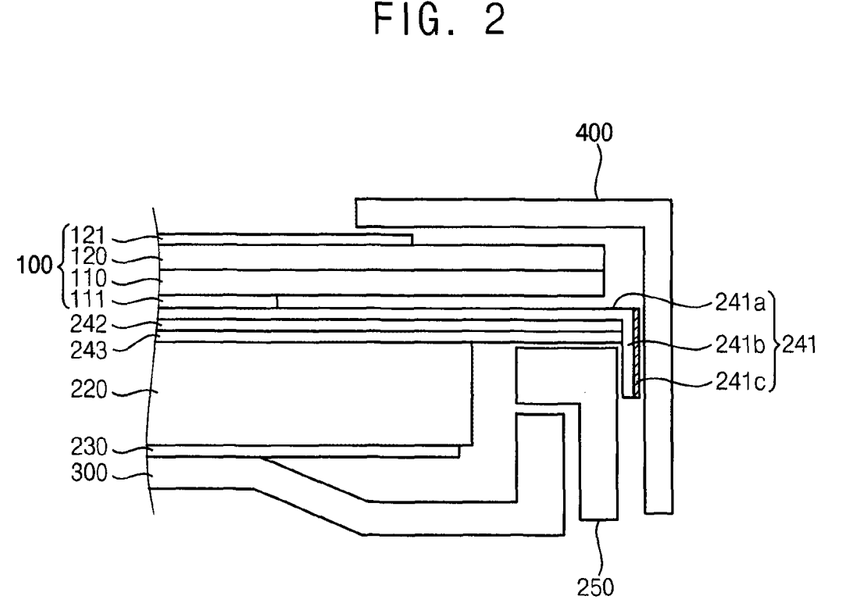
FIG. 2 is a cross-sectional view taken along the lines I-I' of FIG. 1.

FIG. 1 is a perspective view of a liquid crystal display device according to an exemplary embodiment. FIG. 2 is a cross-sectional view taken along the lines I-I' of FIG. 1.

Referring to FIGS. 1 and 2, a liquid crystal display device includes a display panel 100 that displays an image, and a backlight assembly that provides light to the display panel 100. The liquid crystal display device further includes a receiving container 300 that receives the backlight assembly by itself or the backlight assembly with the display panel.

The display panel 100 is disposed on the backlight assembly, and displays an image using light provided by the backlight assembly. The display panel 100 includes a display substrate 110, an opposing substrate 120, a flexible circuit board 130 combined with at least an edge of the display substrate, and a driving circuit board 140 connected to the flexible circuit board 130. The flexible circuit board 130 may include a data driver and a gate driver. In another embodiment, the gate driver may be formed in the same process as a thin film transistor array (not shown) that is to be integrated on the display substrate 110.

The opposing substrate 120 faces the display substrate 110 such that a liquid crystal layer (not shown) is interposed between the display substrate 110 and the opposing substrate 120. FIG. 2 shows that a first polarizing plate 111 and a second polarizing plate 121 are respectively combined with the display substrate 110 and the opposing substrate 120. The first and second polarizing plates 111 and 121 selectively transmit light that have one or more specific polarizing axes. The opposing substrate 120 may include a common electrode (not shown).

The display panel 100 includes a display area DA and a peripheral area PA that border the display area DA. The display area DA controls the transmittance of light provided by the backlight assembly to display an image.

Although not shown in the figures, the display panel 100 includes a plurality of pixels arranged in a matrix configuration. Each of the pixels is electrically connected to a gate line and a data line crossing the gate line. Each of the pixels includes a switching element and a pixel electrode. The switching element is electrically connected to the gate line and the data line. The pixel electrode is electrically connected to the switching element. The liquid crystal layer is aligned by an electric field formed by voltages applied to the pixel electrode and the common electrode to control the transmittance of light provided by the backlight assembly. Each pixel may include a color filter that includes a coloring agent. A color filter may have the color red, green, blue, yellow, cyan, magenta or the like. In another embodiment, the color filter may be disposed on the opposing substrate 120.

The backlight assembly is disposed on and provides light to the display panel 100. The backlight assembly includes a light source unit 210 that generates light, a light guide plate 220 that guides the light generated by the light source unit 210 to the display panel 100, a reflective pate 230 disposed under the light guide plate 220 that reflects light toward the display panel 100, optical sheets (241, 242, 243) disposed on the light guide plate 220 that adjust the characteristics of the light exiting from the light guide plate 220, and a supporting member 250 that is disposed under and supports the optical sheets.

The light source unit 210 is adjacent to at least a side of the light guide plate 220. The light source unit 210 includes a light source 211 that generates a light and a printed circuit board 212 that applies a signal to the light source 211. The light source 211 may be a light emitting diode. The printed circuit board 212 may have a rectangular shape and extend in a direction that is parallel to the side of the light guide plate 220. A plurality of light sources 211 may be arranged along the length of the printed circuit board 212 and spaced apart from each other. The light source 211 may generate one or more colors of light, including red, green, blue, yellow, cyan, magenta, white or the like.

The light guide plate 220 receives light from the light source unit 210 and provides the light to the display panel 100. Light from the light source 211 enters the light guide plate 220 through at least one side surface of the light guide plate 220 that faces the light source 211. The light entering the light guide plate 220 spreads throughout the light guide plate 220 by total reflection and exits from the light guide plate 220 toward the display panel 100 through a light-exiting surface (shown as a top surface in FIGS. 1 and 2) of the light guide plate 220. A bottom surface disposed opposite to the light-exiting surface may include a pattern that adjusts the refraction and/or reflection angle of incident light on the bottom surface. The light guide plate 220 generally has a high light-transmittance to minimize absorption of light. In one embodiment, the light guide plate may include an acrylic resin such as polymethyl methacrylate (PMMA), polycarbonate (PC) resin or the like. In another embodiment, the light guide plate 220 may include glass, silicone resin or the like.

The reflective plate 230 is disposed under the light guide plate 220 and reflects light that travel to the bottom surface of the light guide plate 220. The reflective plate 230 reflects the light back toward the display panel 100 through the light guide plate 220 and thereby improves the brightness of the display panel 100. The reflective plate 230 may include a metal such as silver, a porous plastic material or the like.

The optical sheet 243 is disposed on the light guide plate 220 and improves the characteristics of the light exiting from the light guide plate 220. The backlight assembly may include a plurality of optical sheets. For example, FIG. 2 illustrates that the backlight assembly may include a first optical sheet 241, a second optical sheet 242 disposed under the first optical sheet 241 and a third optical sheet 243 disposed under the second optical sheet 242. In an embodiment, the first optical sheet 241 may be a diffusion sheet that diffuses light, a prism sheet that condenses light, a polarizing sheet that reflects light having certain polarizations, or a protective sheet that protects the second and third optical sheets 242 and 243. A base film of the optical sheets may include a plastic material such as polyethylene terephthalate (PET), polycarbonate (PC), polymethyl methacrylate (PMMA), polystyrene (PS) or the like. The optical sheets may further include a functional layer such as a bead layer, a polarizing layer, a prism layer, an anti-scratch layer or the like.

The second optical sheet 242 and the third optical sheet 243 may function the same or differently as the first optical sheet 241. For example, if the first optical sheet 241 is a protective sheet, the second optical sheet 242 may be a prism sheet, and the third optical sheet 243 may be a diffusion sheet. The functions and positions of the optical sheets may be varied. For example, the first optical sheet 241 may be a diffusion sheet in another embodiment.

Although the backlight assembly of the embodiment shown in FIGS. 1 and 2 includes three optical sheets, the number of optical sheets is not limited thereto. For example, the backlight assembly of other embodiments may include two optical sheets or four or more optical sheets. In another embodiment, the backlight assembly may include a single multi-functional optical sheet.

In an embodiment, the optical sheets may have a planar shape and be disposed parallel to the light-exiting surface of the light guide plate 220. The supporting member 250 may include a protrusion portion (not shown) that passes through the optical sheets.

Referring to FIGS. 1 and 2, the first optical sheet 231 includes a light-transmitting portion 241a and an extending portion 241b, which may be formed as a unitary single unit of the same material and continuously connected to each other without an adhesive or the like. The light-transmitting portion 241a extends in a first direction that may be parallel to the second optical sheet 242 and the third optical sheet 243. The extending portion 241b extends continuously from an end of the light-transmitting portion 241a in a second direction that may intersect the first direction perpendicularly. At least a portion of the light-transmitting portion 241a may overlap with the display area DA of the display panel 100. The extending portion 241b may cover a side surface of a member disposed under the first optical sheet 241. For example, FIG. 2 illustrates that the extending portion 241b may extend in the second direction to cover and surround the side surfaces of the second optical sheet 242, the third optical sheet 243 and the supporting member 250.

The light-transmitting portion 241a and the extending portion 241b may be formed from the same sheet. For example, a groove or a cutting portion having a dot shape may be formed at a boundary area of the sheet for dividing the light-transmitting portion 241a and the extending portion 241b. Thereafter, the sheet may be bent at the boundary area to form the first optical sheet 241 that includes the light-transmitting portion 241a and the extending portion 241b which continuously extends from the light-transmitting portion 241a. In another embodiment, the first optical sheet 241 may be formed from a mold having a corresponding shape.

The first optical sheet 241 may include a side light-blocking portion 241c that is combined with the extending portion 241b. The side light-blocking portion 241c blocks light from leaking through the side surfaces of the second optical sheet 242 and the third optical sheet 243 and prevents light leakage in the peripheral area of the display panel 100. The side light-blocking portion 241c may include a light-blocking material such as a black pigment or the like.

The side light-blocking portion 241c may be combined with the extending portion 241b using various methods. For example, an adhesive tape that includes the side light-blocking portion 241c may be attached to the extending portion 241b. Alternatively, the side light-blocking portion 241c may be printed onto at least a surface of the extending portion 241b to form a printed light-blocking layer. Because the printed light-blocking layer is directly combined with the extending portion 241b, combination stability is generally higher than if adhesive tape is used for the combination. Higher combination stability between the side light-blocking portion 241c and the extending portion 241b means that separation does not occur or is unlikely to occur at the usual high operating temperatures of the liquid crystal display device. In other words, printing the light-blocking layer directly onto the surface of the extending portion 241b improves the reliability of the light-blocking layer at high temperatures and prevents contamination due to impurities that would otherwise separate from an adhesive tape.

In an embodiment, the printed light-blocking layer includes a pattern array that has a repeating shape. For example, the pattern array may have a straight shape, a circular shape, a polygonal shape or the like, and include a plurality of patterns that are spaced apart from each other or continuously connected to each other. An ink, such as a black pigment, may be screen-coated on the surface of the extending portion 241b to form the pattern array of the printed light-blocking layer. In other words, the extending portion 241b may function as a base substrate for printing a light-blocking layer.

As FIGS. 1 and 2 illustrate, the supporting member 250 is disposed under and supports the optical sheets. The supporting member 250 also guides the position of the light guide plate 220. The supporting member 250 may be combined with the receiving container 300. The extending portion 241b of the first optical sheet 241 may cover and directly face the side surface of the supporting member 250. In another embodiment, other elements such as a portion of the receiving container 300 may be disposed between the extending portion 241b and the supporting member 250.

FIG. 2 illustrates that the receiving container 300 includes a bottom portion and a sidewall that extends from the bottom portion. The light guide plate 220 and the reflective plate 230 are disposed in the receiving container 300. The receiving container 300 may be combined with the supporting member 250 through a hook combination or the like. A side surface of the supporting member 250 may face an inner or outer surface of the receiving container 300.

The liquid crystal display device may further include a fixing frame 400 disposed on the display panel 100. The fixing frame 400 may include a first surface that extends in the first direction and an opening that exposes the display area of the display panel 100. The fixing frame 400 may further include a second surface that extends in the second direction from the first surface and surrounds a side surface of the receiving container 300. The fixing frame 400 combines with the receiving container 300 to hold and secure the display panel 100. In another embodiment, the fixing frame 400 may include a plurality of sub-frames that are separable from each other.

FIGS. 3 to 10 are cross-sectional views of liquid crystal display devices according to exemplary embodiments. It should be noted that although certain elements among the figures are identified using the same reference numerals, differences (as shown in the figures or discussed herein) may exist.

Figure 3:
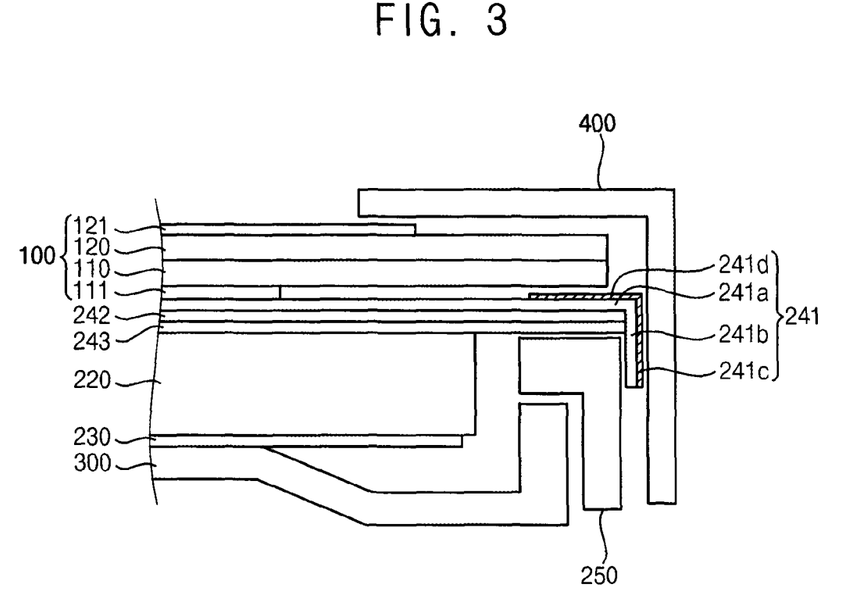
FIGS. 3 to 10 are cross-sectional views of liquid crystal display devices according to exemplary embodiments.

Referring to FIG. 3, an extending portion 241b of a first optical sheet 241 is combined with a side light-blocking portion 241c, and a transmitting portion 241a of the first optical sheet 241 is combined with a front light-blocking portion 241d. The front light-blocking portion 241d is disposed on and along an edge of the light-transmitting portion 241a. The front light-blocking portion 241d may be continuously connected to the side light-blocking portion 241c or separated from the side light-blocking portion 241c. Because the first optical sheet 241 further includes the side light-blocking portion 241c, light leakage through an end of the light-transmitting portion 241a is prevented.

Figure 4:
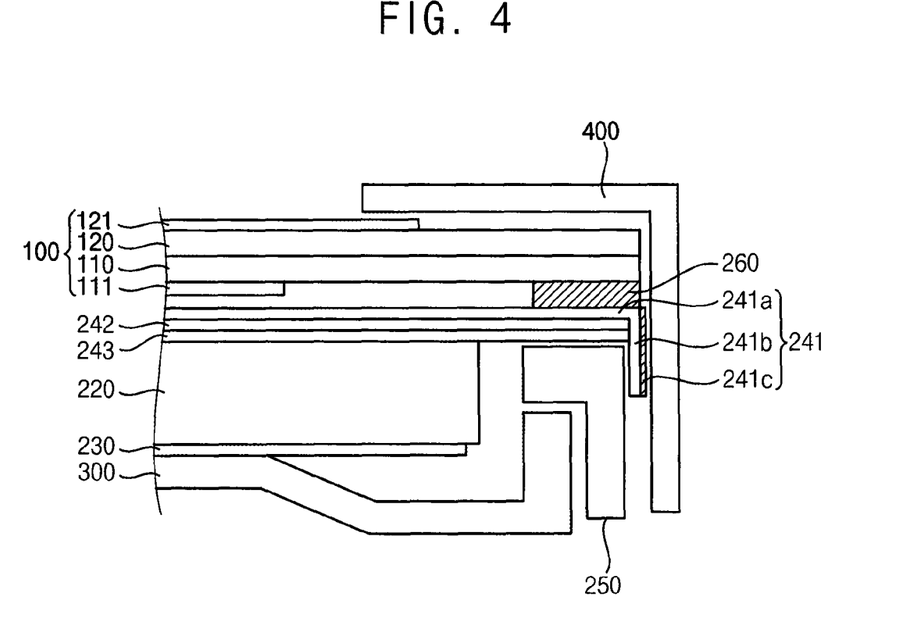

Referring to FIG. 4, a liquid crystal display device further includes a spacer 260 that is disposed between the display panel 100 and the first optical sheet 241 to maintain a gap between the display panel 100 and the first optical sheet 241. The spacer 260 helps to prevent damage such as fracturing of the display panel 100 and/or the first optical sheet 241. The spacer 260 may include an elastic material such as rubber, silicone resin or the like. An upper surface and/or a lower surface of the spacer 260 may include an adhesive layer for combining with the display panel 100 and/or the first optical sheet 241.

Figure 5:
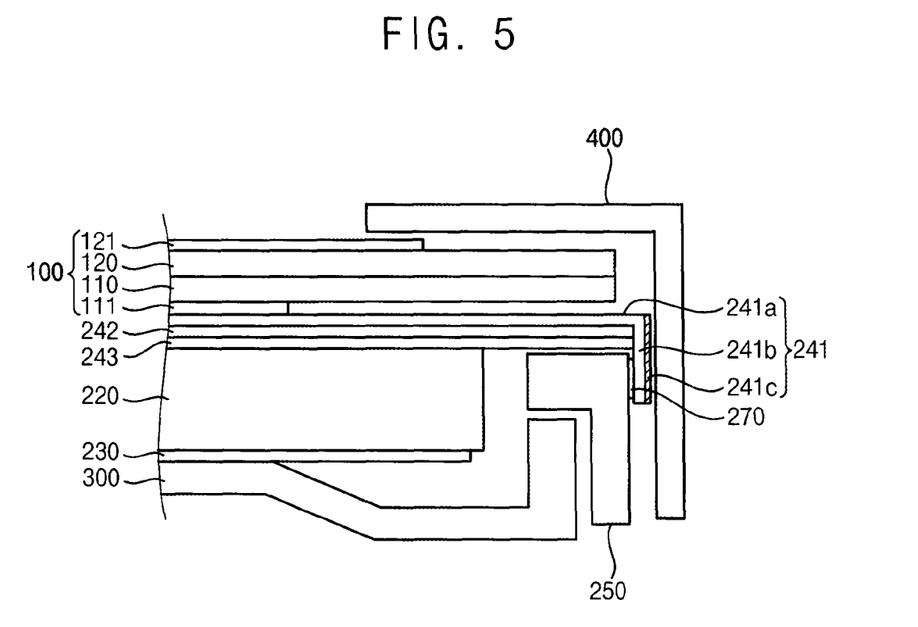

Referring to FIG. 5, an extending portion 241b of a first optical sheet 241 and a supporting member 250 are combined using an adhesive member 270. For example, the adhesive member 270 adheres to a side surface of the supporting member 250 and the extending portion 241b. The adhesive member 270 may be an adhesive tape. The adhesive member 270 may stably guide and secure the position of the first optical sheet 241.

Figure 6:
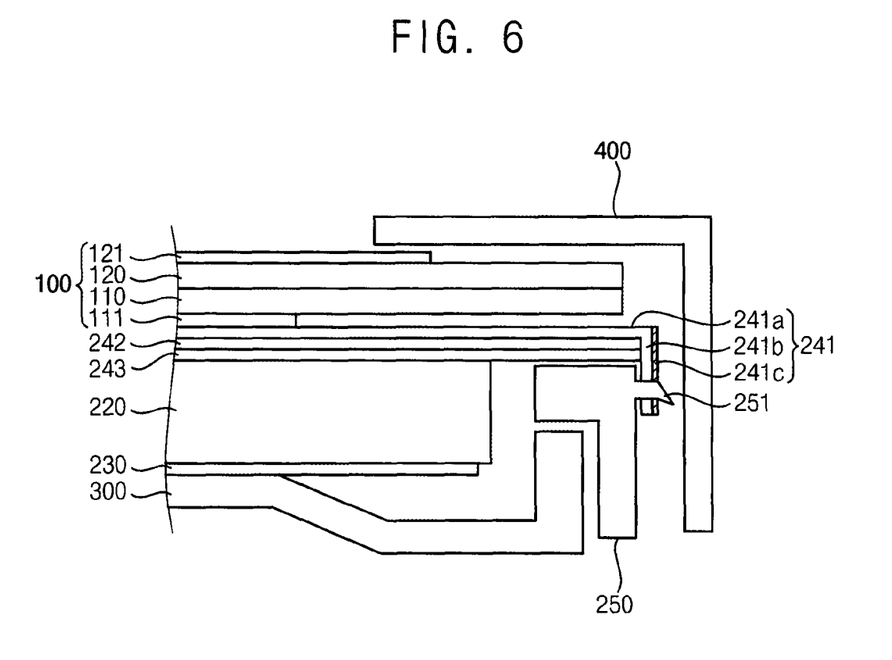

Referring to FIG. 6, an extending portion 241b of a first optical sheet 241 includes a combination hole, and a supporting member 250 includes a protrusion 251 that inserts into the combination hole. For example, the protrusion 251 may protrude from a side surface of the supporting member 250 toward the extending portion 241b. Because the protrusion 251 is inserted into the combination hole, the first optical sheet 241 may be stably guided and secured.

Figure 7:
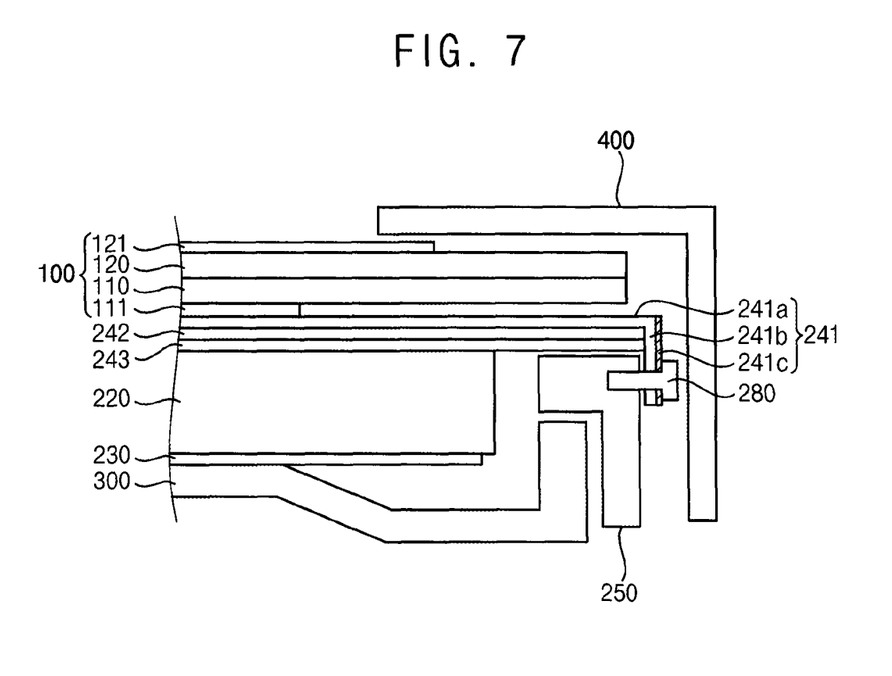

Referring to FIG. 7, a first optical sheet 241 and a supporting member 250 are combined using a combination member 280 that passes through an extending portion 241b of the first optical sheet 241 and inserts into the supporting member 250. The combination member 280 may further pass through the supporting member 250. The combination member 280 may include a screw, a bolt or the like. In another embodiment, the combination member 280 may pass through the extending portion 241b and the supporting member 250 and insert into a receiving container 300 to combine the first optical sheet 241, the supporting member 250 and the receiving container 300.

Figure 8:
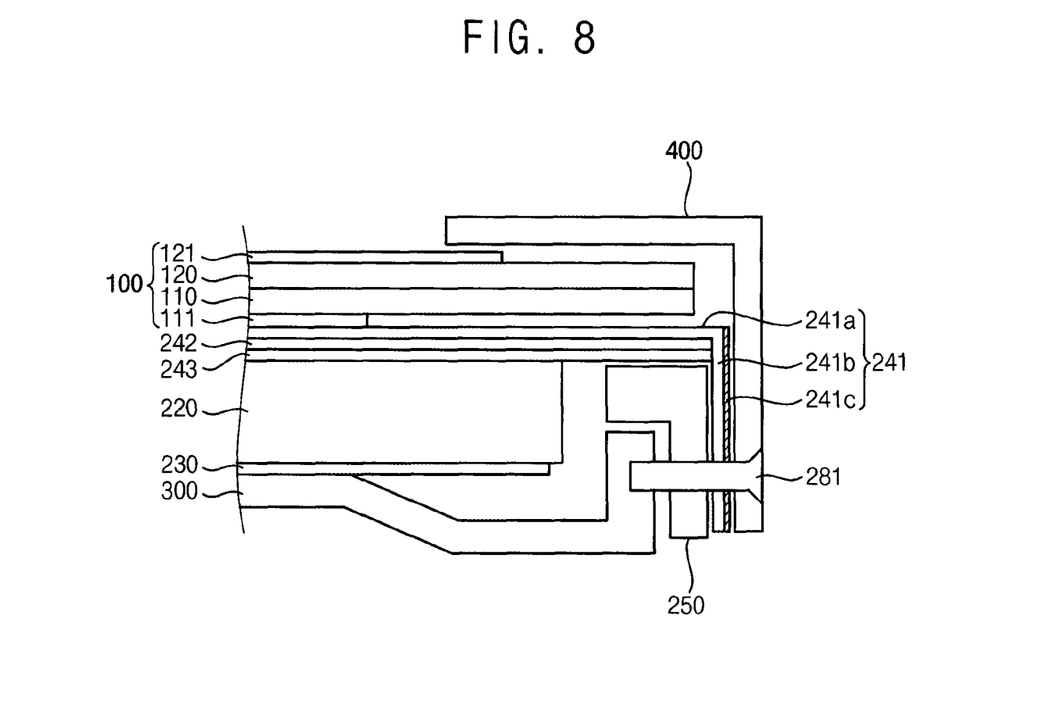

Referring to FIG. 8, a fixing frame 400, a first optical sheet 241, a supporting member 250 and a receiving container 300 are combined using a combination member 281. The combination member 281 passes through the fixing frame 400, an extending portion 241b, the first optical sheet 241 and the supporting member 250 and inserts into the receiving container 300. An end of the combination member 281 may entirely insert into the fixing frame 400 such that the combination member 281 does not protrude from a side surface of the fixing frame 400. The combination member 281 may further pass through the receiving container 300.

Figure 9:
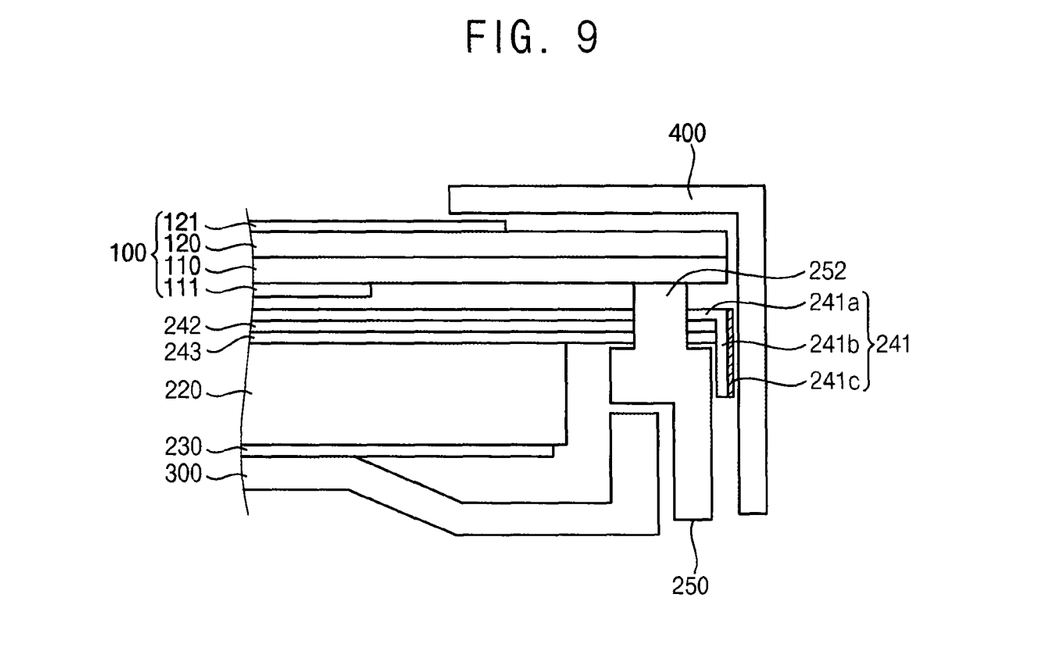

Referring to FIG. 9, a light-transmitting portion 241a of a first optical sheet 241 includes a hole, and a supporting member 250 includes a supporting protrusion 252 that inserts into the hole. Having the supporting protrusion 252 insert into the hole of the first optical sheet 241 stably guides and secures the horizontal position of the first optical sheet 241. Furthermore, the supporting protrusion 252 passes through the first optical sheet 241 and contacts a lower surface of the display panel 100 to maintain a gap between the display panel 100 and the first optical sheet 241, which may prevent damage such as fracturing of the display panel 100 and/or the first optical sheet 241. The end of the supporting protrusion 252 that contacts the display panel 100 may include an elastic material such as rubber, silicone resin or the like.

Figure 10:
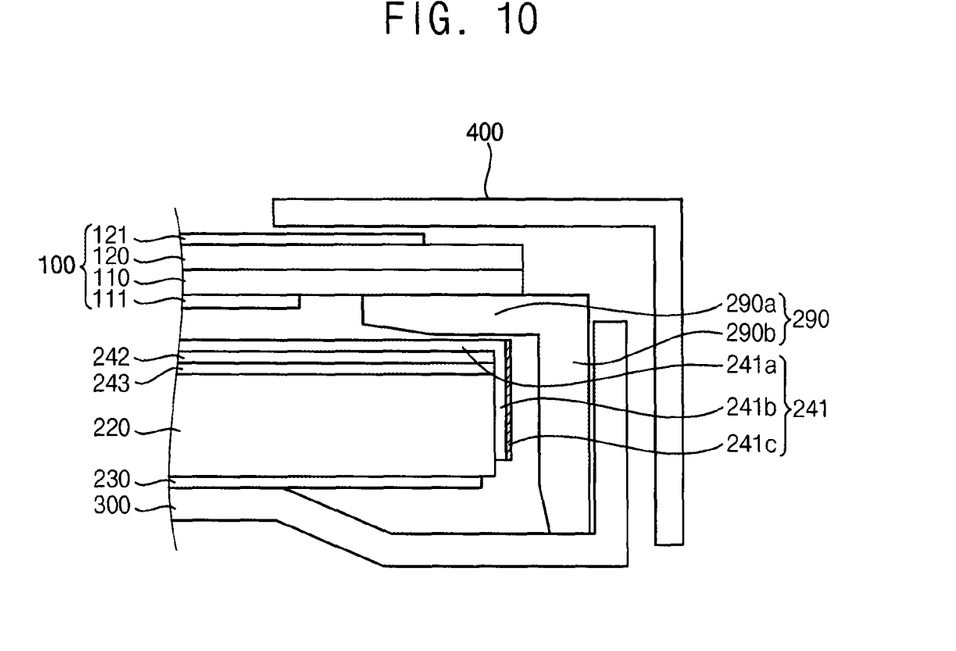

Referring to FIG. 10, a liquid crystal display device includes a supporting member 290 that supports a display panel 100. A receiving container 300 includes a bottom portion and a sidewall that extends from the bottom portion. The sidewall of the receiving container 300 covers an outer side surface of the supporting member 290. A fixing frame 400 covers an outer side surface of the sidewall of the receiving container 300. Optical sheets 241, 242, 243 are disposed on a light guide plate 220, one above the other, with the optical sheet 243 being closest to the light guide plate 220.

The supporting member 290 includes a sidewall portion 290b that surrounds a side surface of the optical sheet 241, and a supporting portion 290a that extends from the sidewall portion 290b to be disposed between the display panel 100 and a first optical sheet 241. The sidewall portion 290b of the supporting member 290 may face an extending portion 241b of the first optical sheet 241. Furthermore, the sidewall portion 290b of the supporting member 290 may cover side surfaces of the light guide plate 220 and a reflective plate 230. The supporting member 290 supports the display panel 100 and maintains a gap between the display panel 100 and the first optical sheet 241, which helps to prevent damage such as fracturing of the display panel 100 and the first optical sheet 241. A contact member (not shown) that includes an elastic material such as rubber, silicone resin or the like, may be interposed between a contact surface of the supporting portion 290a and a contact surface of the display panel 100.

Figure 11:
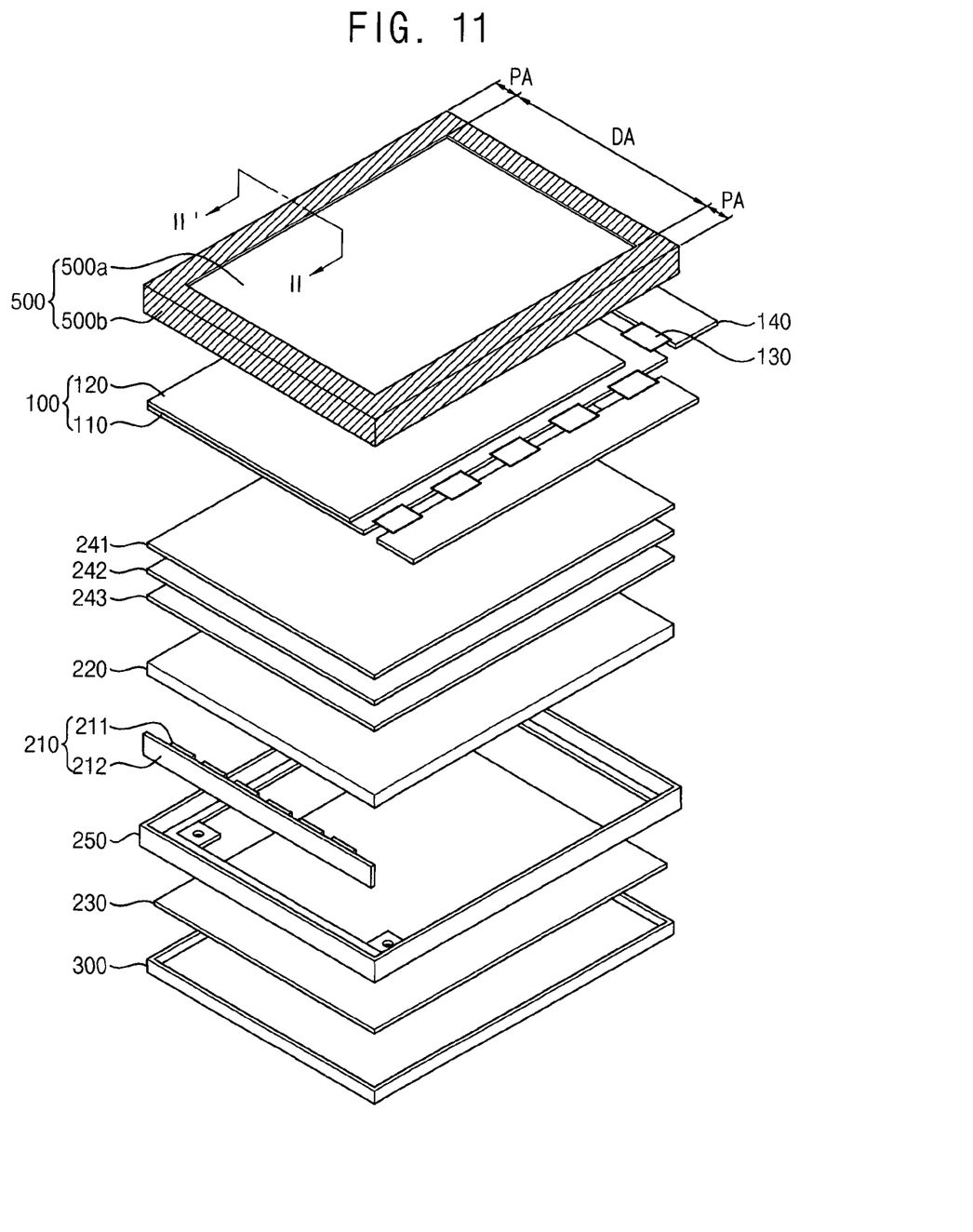
FIG. 11 is a perspective view of a liquid crystal display device according to another exemplary embodiment.
Figure 12:
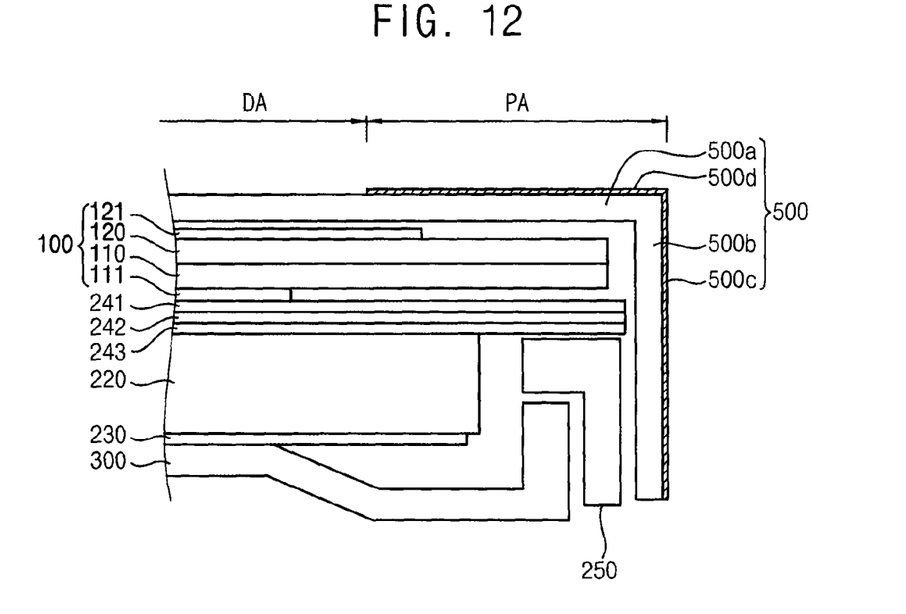
FIG. 12 is a cross-sectional view taken along the lines II-II' of FIG. 11.

FIG. 11 is a perspective view of a liquid crystal display device according to another exemplary embodiment. FIG. 12 is a cross-sectional view taken along the lines II-II' of FIG. 11.

Referring to FIGS. 11 and 12, a liquid crystal display device includes a backlight assembly. The backlight assembly includes a light source unit 210 that generates light, a light guide plate 220 that guides the light generated by the light source unit 210 to the display panel 100, a reflective pate 230 disposed under the light guide plate 220 that reflects light toward the display panel 100, optical sheets (241, 242, 243) disposed on the light guide plate 220 that adjust characteristics of the light exiting from the light guide plate 220, and a supporting member 250 that is disposed under and supports the optical sheets. The liquid crystal display device further includes a display panel 100 disposed on the backlight assembly, and a cover sheet 500 disposed on the display panel 100 to cover and secure the display panel 100.

The display panel 100 includes a display substrate 110, a flexible circuit board 130 combined with at least an edge of the display substrate, and a driving circuit board 140 connected to the flexible circuit board 130. The flexible circuit board 130 may include a data driver and a gate driver. In another embodiment, the gate driver may be formed in the same process as a thin film transistor array (not shown) that is to be integrated on the display substrate 110.

The cover sheet 500 is disposed on the display panel 100. The cover sheet 500 secures and protects the display panel 100. The cover sheet 500 includes a light-transmitting portion 500a that extends in a first direction, and an extending portion 500b that extends continuously from the light-transmitting portion 500a in a second direction different from the first direction. The first direction may be parallel to the display panel 100. The second direction may be perpendicular to the first direction. At least a portion of the light-transmitting portion 500a overlaps with a display area DA of the display panel 100. The extending portion 500b covers a side surface of a member disposed under the cover sheet 500, for example, the display panel 100. The light-transmitting portion 500a and the extending portion 500b may be formed as a unitary single unit from the same material such that the two portions are directly connected to each other without using an adhesive member or the like.

The light-transmitting portion 500a and the extending portion 500b may be formed from the same sheet. For example, a groove or a cutting portion having a dot shape may be formed at a boundary area of the sheet for dividing the light-transmitting portion 500a and the extending portion 500b. Thereafter, the sheet may be bent at the boundary area to form the cover sheet 500 that includes the light-transmitting portion 500a and the extending portion 500b which continuously extends from the light-transmitting portion 500a. In another embodiment, the cover sheet 500 may be formed from a mold having a corresponding shape.

Examples of a material that may be used for the cover sheet 500 may include polyethylene terephthalate (PET), polycarbonate (PC), polymethyl methacrylate (PMMA), polystyrene (PS) or the like. In another embodiment, the cover sheet 500 may include glass or silicone resin.

At least a portion of the light-transmitting portion 500a may be transparent to transmit light exiting from the display panel 100. The cover sheet 500 may include a side light-blocking portion 500c that is combined with the extending portion 500b. Furthermore, the cover sheet 500 may further include a front light-blocking portion 500d that is combined with the light-transmitting portion 500a.

The side light-blocking portion 500c and the front light-blocking portion 500d block light from leaking through an edge of the backlight assembly. Furthermore, the side light-blocking portion 500c and the front light-blocking portion 500d may prevent a peripheral area PA of the display panel 100, the flexible printed circuit board 130 and the driving circuit board 140 from being perceived or exposed. The side light-blocking portion 500c and the front light-blocking portion 500d may include a light-blocking material such as a black pigment. The side light-blocking portion 500c may be formed on an adhesive tape that adheres to the extending portion 500b or as a printed light-blocking layer that is printed directly on the extending portion 500b. The front light-blocking portion 500d may have substantially the same composition as the side light-blocking portion 500c. The front light-blocking portion 500d may be separated from or continuously connected to the side light-blocking portion 500c.

The liquid crystal display device may further include a protective member (not shown) that is disposed between the flexible circuit board 130 and the cover sheet 500 to protect the flexible circuit board 130, or between the driving circuit board 140 and the cover sheet 500 to protect the driving circuit board 140. The protective member may include an elastic material or an insulation material such as rubber, polymer foam or the like.

Figure 13:
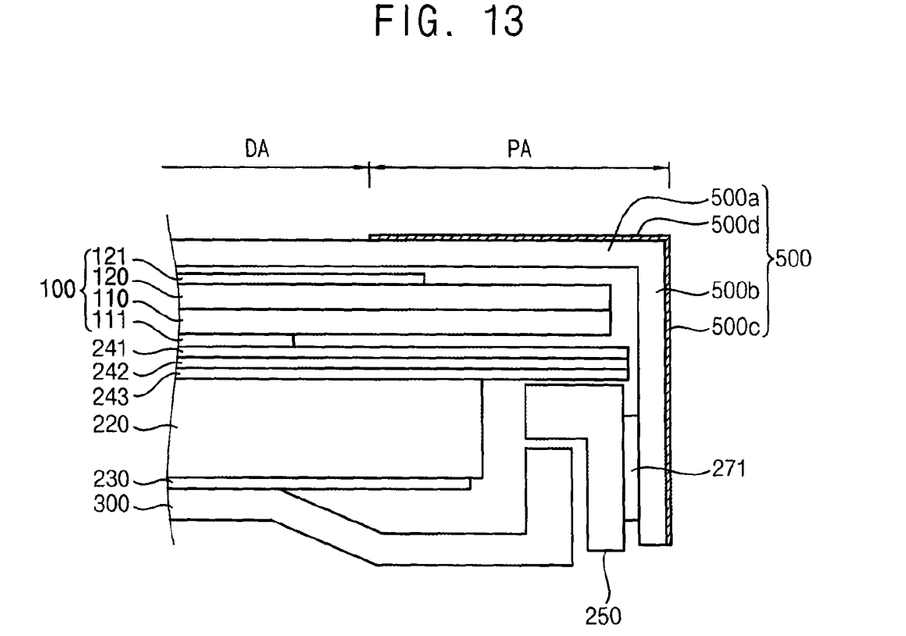
FIGS. 13 to 15 are cross-sectional views of liquid crystal display devices according to exemplary embodiments.
Figure 14:
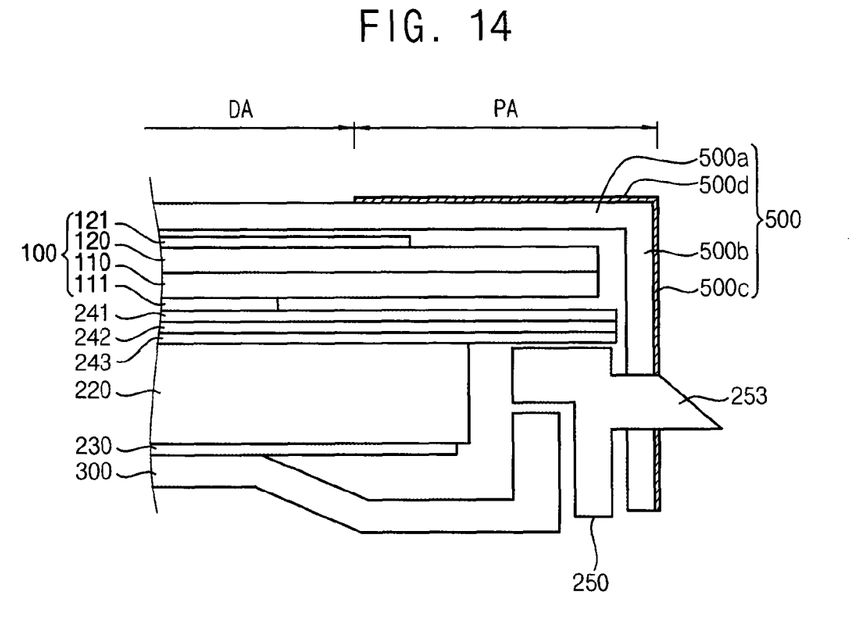
Figure 15:
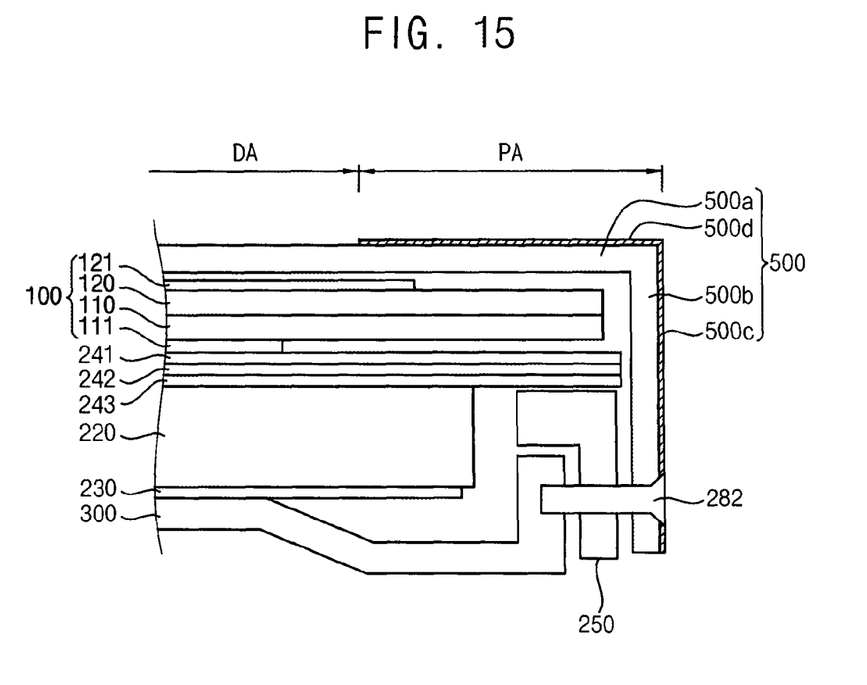

FIGS. 13 to 15 are cross-sectional views of liquid crystal display devices according to exemplary embodiments. Referring to FIG. 13, an extending portion 500b of a cover sheet 500 and a supporting member 250 are combined using an adhesive member 271. For example, the adhesive member 271 adheres to a side surface of the supporting member 250 and the extending portion 241b. The adhesive member 270 may be an adhesive tape. The adhesive member 270 may stably guide and secure the position of the cover sheet 500.

Referring to FIG. 14, an extending portion 500b of a cover sheet 500 includes a combination hole, and a supporting member 250 includes a protrusion 253 that inserts into the combination hole. For example, the protrusion 253 may protrude from a side surface of the supporting member 250 toward the extending portion 500b. Because the protrusion 253 is inserted into the combination hole, the cover sheet 500 may be stably guided and secured.

Referring to FIG. 15, a cover sheet 500, a supporting member 250 and a receiving container 300 are combined using a combination member 282. The combination member 282 passes through an extending portion 500b of the cover sheet 500 and the supporting member 250 and inserts into the receiving container 300. An end of the combination member 282 may be entirely inserted into the cover sheet 500 such that the combination member 282 does not protrude from a side surface of the extending portion 500b. The combination member 282 may further pass through the receiving container 300. In another embodiment, the combination member 282 may pass through the extending portion 500b of the cover sheet 500 to insert into the supporting member 250.

According to the exemplary embodiments, the liquid crystal display device including the cover sheet 500 may protect and secure the display panel 100 and reduce the bezel size of liquid crystal display device.

The backlight assemblies of the above-discussed embodiments have an edge-type structure wherein a light source unit is disposed under an edge of a display panel. However, the present system and method are not limited to an edge-type structure and are applicable to various types of structures such as a direct-type, a corner-type, a center-type or the like. It should be understood that the foregoing discussion is illustrative and does not limit the present system and method to the specific exemplary embodiments disclosed.

What is claimed is:

1. A liquid crystal display device comprising: a backlight assembly including a light source that generates a light and an optical sheet that transmits the light; and a display panel disposed on the backlight assembly, wherein the optical sheet includes a light-transmitting portion and an extending portion that are formed as a unitary single unit, and further includes a side light-blocking portion that is combined with and in contact with the extending portion, wherein the light-transmitting portion extends in a first direction and the extending portion extends continuously from an end of the light-transmitting portion in a second direction that is different from the first direction; and wherein the side light-blocking portion is spaced apart from and separated from the display panel, and the side light-blocking portion has a conformal shape along a surface of the extending portion.

2. The liquid crystal display device of claim 1, wherein the second direction is perpendicular to the first direction.

3. The liquid crystal display device of claim 1, wherein the side light-blocking portion includes a printed light-blocking layer that contains a black pigment and is printed on at least a surface of the extending portion.

4. The liquid crystal display device of claim 1, further comprising a supporting member that supports the optical sheet, wherein the extending portion of the optical sheet covers at least a portion of a side surface of the supporting member.

5. The liquid crystal display device of claim 4, further comprising an adhesive member that secures the extending portion with the side surface of the supporting member.

6. The liquid crystal display device of claim 4, wherein the extending portion includes a combination hole, and the supporting member includes a protrusion that inserts into the combination hole.

7. The liquid crystal display device of claim 1, wherein the optical sheet is a diffusion sheet, a prism sheet, a polarizing sheet or a protective sheet, and the liquid crystal display device further includes at least one additional optical sheet disposed under the optical sheet, and the extending portion of the optical sheet covers a side surface of the additional optical sheet.

\* \* \* \* \*